(12) United States Patent
Aoki et al.

(10) Patent No.: US 6,514,147 B2
(45) Date of Patent: Feb. 4, 2003

(54) FLEXIBLE SHAFT COUPLING FOR VEHICLES

(75) Inventors: Hidekazu Aoki, Kanagawa (JP); Takayuki Yokota, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/870,739

(22) Filed: Jun. 1, 2001

(65) Prior Publication Data

US 2001/0051543 A1 Dec. 13, 2001

(30) Foreign Application Priority Data

Jun. 5, 2000 (JP) .................................. 2000-167297
Jun. 7, 2000 (JP) .................................. 2000-171047

(51) Int. Cl.⁷ .................................................. F16D 3/52
(52) U.S. Cl. ........................ 464/98; 464/137; 403/337
(58) Field of Search ........................... 464/87, 137, 92, 464/93, 98, 99; 403/203, 220, 335, 337

(56) References Cited

U.S. PATENT DOCUMENTS

| | | | | |
|---|---|---|---|---|
| 3,759,064 A | * | 9/1973 | Jorn et al. .................. | 464/99 |
| 3,798,924 A | * | 3/1974 | Downey ...................... | 464/93 |
| 3,985,000 A | * | 10/1976 | Hartz ......................... | 403/337 |
| 4,114,472 A | * | 9/1978 | Hornig et al. ............... | 464/99 |
| 4,428,738 A | * | 1/1984 | Loubier ...................... | 464/93 |
| 4,487,551 A | * | 12/1984 | Mizutani et al. ............. | 464/98 |
| 4,768,992 A | * | 9/1988 | Mancuso et al. ............. | 464/69 |
| 5,286,231 A | * | 2/1994 | Zilberman et al. ........... | 464/93 |
| 5,338,259 A | * | 8/1994 | Lobel ......................... | 464/93 |
| 6,200,223 B1 | * | 3/2001 | Martens ....................... | 464/99 |

FOREIGN PATENT DOCUMENTS

| | | |
|---|---|---|
| JP | 60-189620 | 12/1985 |
| JP | 63-178632 | 11/1988 |

* cited by examiner

Primary Examiner—Lynne H. Browne
Assistant Examiner—Kenneth Thompson
(74) Attorney, Agent, or Firm—Foley & Lardner

(57) ABSTRACT

A shaft coupling includes an annular plate having a proper axial flexibility. The annular plate is formed with mounting holes. A first group of coupled portions are fixedly connected to an input shaft, whereas a second group of coupled portions are fixedly connected to an output shaft. The first and second groups of coupled portions are coupled with each other through the annular plate placed therebetween, so that the first and second groups of coupled portions circumferentially alternate with each other. The annular plate has coupling arm portions each extending between two adjacent mounting holes to absorb axial vibrations. A radial width of the coupling arm portion is dimensioned to be narrower than a radial width of a peripheral region of each of the mounting holes. A length of the coupling arm portion is dimensioned to be longer than a distance between the two adjacent mounting holes.

16 Claims, 10 Drawing Sheets

FLEXIBLE SHAFT COUPLING FOR VEHICLES

BACKGROUND OF THE INVENTION

1. Field of the Invention

The present invention relates to a flexible shaft coupling suitable for a propeller shaft used as a drive line component of a vehicle, and particularly to an axially flexible drive-shaft coupling designed to permit axial motion and thus to elastically absorb vibrations for axial directions.

2. Description of the Related Art

In recent years, there have been proposed and developed various shaft couplings capable of absorbing axial vibrations. Such shaft couplings have been disclosed in Japanese Utility-Model Provisional Publication Nos. 63-178632 (hereinafter is referred to as JP63-178632) and 60-189620 (hereinafter is referred to as JP60-189620). FIGS. 10 and 11 show a conventional shaft coupling disclosed in JP63-178632, in which the shaft coupling, called "centering bushing" is used between the output shaft of the transmission and the propeller shaft. A plurality of bushes 2 are provided in a substantially annular main body 1 made of an elastic or elastomeric rubber material so that the bushes are circumferentially equidistant spaced to each other. The respective two adjacent bushes (2, 2) are connected to each other by means of a reinforcing wire 8 having a high rigidity (see FIG. 11). As best seen in FIG. 10, the first shaft (the transmission output shaft) 3 has a yoke 5 at its one axial end, whereas the second shaft (the propeller shaft) 4 has a yoke 6 at its one axial end. Yoke 5 has a plurality of branched arms (5a, 5a, 5a) circumferentially 120°-spaced with each other, while yoke 6 has a plurality of branched arms (6a, 6a, 6a) circumferentially 120°-spaced with each other. As can be seen in FIG. 11, the first group of branched arms (5a, 5a, 5a) alternate with the second group of branched arms (6a, 6a, 6a), sandwiching the annular main body 1 therebetween. These branched arms are bolted to the respective bushes 2 of shaft-coupling main body 1 by means of bolts 12. The axial end of first shaft 3 penetrates the central portion of shaft-coupling main body 1, and centered in the second shaft 4 through a substantially ring-shaped rubber bushing 7. Reinforcing wires 8 properly elastically permit relative displacement between first and second shafts 3 and 4. Reinforcing wires 8 also effectively rigidly transmit the rotational force (torque) byway of tension of the reinforcing wires. The shaft coupling shown in FIGS. 10 and 11, is complicated in structure, thus increasing the number of component parts and resulting in a large-sized coupling assembly. Instead of using the axially flexible shaft coupling shown in FIGS. 10 and 11, a simple, metal-plate, shaft coupling (as disclosed in JP60-189620) as shown in FIG. 12 is often used. As shown in FIG. 12, the metal-plate shaft coupling is comprised of a plurality of substantially annular metal plates 9 each having a plurality of bolt holes 10 formed therein and circumferentially equidistantly spaced to each other. Output-shaft coupled portions (corresponding to the first group of branched arms 5a) and input-shaft coupled portions (corresponding to the second group of branched arms 6a), alternating with each other in the circumferential direction, are bolted via the respective bolt holes 10 of each annular metal plate 9 with washers 11 to the substantially annular metal plates 9, sandwiching the annular metal plates between the first and second group of coupled portions. Each annular metal late 9 is a metal plate having a predetermined constant thickness that provides a comparatively high rigidity. Its radial width A' is fixed to a certain value such that the metal plate 9 is generally annular in shape. A portion 9a extending between two adjacent bolt holes (10, 10) of metal plate 9 will be hereinafter referred to as a "coupling arm portion". Each coupling arm portion 9a is able to elastically deform or bend in the presence of input vibrations for each axial direction, so as to effectively dampen or absorb the axial vibrations. When torque (a rotational force acting in the direction of rotation) is applied to the metal-plate shaft coupling of FIG. 12, the coupling arm portion 9a serves to rigidly transmit torque therevia to the output side without any deformation, because of a high inertial mass in the rotational direction. In the shaft coupling as disclosed in JP60-189620, output and input shafts can be centered each other via the inner peripheral portion of each annular metal plate 9 having a high rigidity. This eliminates the necessity of a centering mechanism. On such annular metal-plate shaft couplings, there are two ways to enhance the axial vibration dampening effect. One way to effectively dampen axial vibrations, is to decrease the thickness of each annular metal plate 9 so as to reduce the rigidity of each coupling arm portion 9a for each axial direction. However, there are limitations to a reduction in the thickness of the annular metal plate. The other way is to lengthen the circumferential length of each coupling arm portion 9a. This undesirably increases the total size of the metal-plate shaft coupling. Generally, the metal-plate shaft coupling has worn portions around each bolt hole 10 owing to relative displacement of annular metal plate 9 to the bolts and relative displacement between two adjacent annular metal plates (9, 9) coaxially put side by side, during axial displacement of annular metal plates 9. Excessively thinner annular metal plate lowers the durability of the shaft coupling. Therefore, it is desirable to balance these contradictory requirements, that is to say, high durability, light weight (down-sized shaft coupling), and proper axial flexibility (enhanced axial vibration dampening effect).

SUMMARY OF THE INVENTION

In order to accomplish the aforementioned and other objects of the present invention, a flexible shaft coupling for a vehicle comprises a substantially annular plate having a plurality of mounting holes formed therein, a first group of coupled portions fixedly connected to a first shaft and circumferentially spaced with respect to each other, a second group of coupled portions fixedly connected to a second shaft and circumferentially spaced with respect to each other, the first and second groups of coupled portions being coupled with each other through the substantially annular plate placed therebetween, so that the first group of coupled portions circumferentially alternate with the second group of coupled portions, the substantially annular plate having coupling arm portions each extending between two adjacent mounting holes of the mounting holes to absorb vibrations for axial directions by elastic deformation of each of the coupling arm portions, and a radial width of each of the coupling arm portions being dimensioned to be narrower than a radial width of a peripheral region of each of the mounting holes.

According to another aspect of the invention, a flexible shaft coupling for a vehicle comprises a substantially annular plate serving as a torque-transmission member for rotational directions and having a plurality of mounting holes formed therein, a first group of coupled portions fixedly connected to a first shaft and circumferentially spaced with respect to each other, a second group of coupled portions fixedly connected to a second shaft and circumferentially spaced with respect to each other, the first and second groups of coupled portions being coupled with each other through the substantially annular plate placed therebetween, so that the first group of coupled portions circumferentially alternate with the second group of coupled portions, the substantially annular plate having coupling arm portions each extending between two adjacent mounting holes of the mounting holes to absorb vibrations for axial directions by elastic deformation of each of the coupling arm portions, and a thickness of each of the coupling arm portions being dimensioned to be thinner than a thickness of a peripheral region of each of the mounting holes.

According to a still further aspect of the invention, a flexible shaft coupling for a vehicle comprises a substantially annular plate serving as a torque-transmission member for rotational directions and having a plurality of mounting holes formed therein, a first group of coupled portions fixedly connected to an output shaft and circumferentially spaced with respect to each other, a second group of coupled portions fixedly connected to an input shaft and circumferentially spaced with respect to each other, the first and second groups of coupled portions being coupled with each other through the substantially annular plate placed therebetween by way of fastening means, so that the first group of coupled portions circumferentially alternate with the second group of coupled portions, the substantially annular plate having coupling arm portions each extending between two adjacent mounting holes of the mounting holes for the fastening means to absorb vibrations for axial directions by elastic deformation of each of the coupling arm portions, each of the coupling arm portions has a lightening hole formed therein, and each of the coupling arm portions is divided by the lightening hole into a first radial-outward arm portion placed outside of a hypothetical line segment between and including centers of the two adjacent mounting holes and a second radial-inward arm portion placed inside of the hypothetical line segment, and a sum of a radial width of the first radial-outward arm portion and a radial width of the second radial-inward arm portion being dimensioned to be narrower than a radial width of a peripheral region of each of the mounting holes.

DESCRIPTION OF THE EMBODIMENTS

Figure 1:
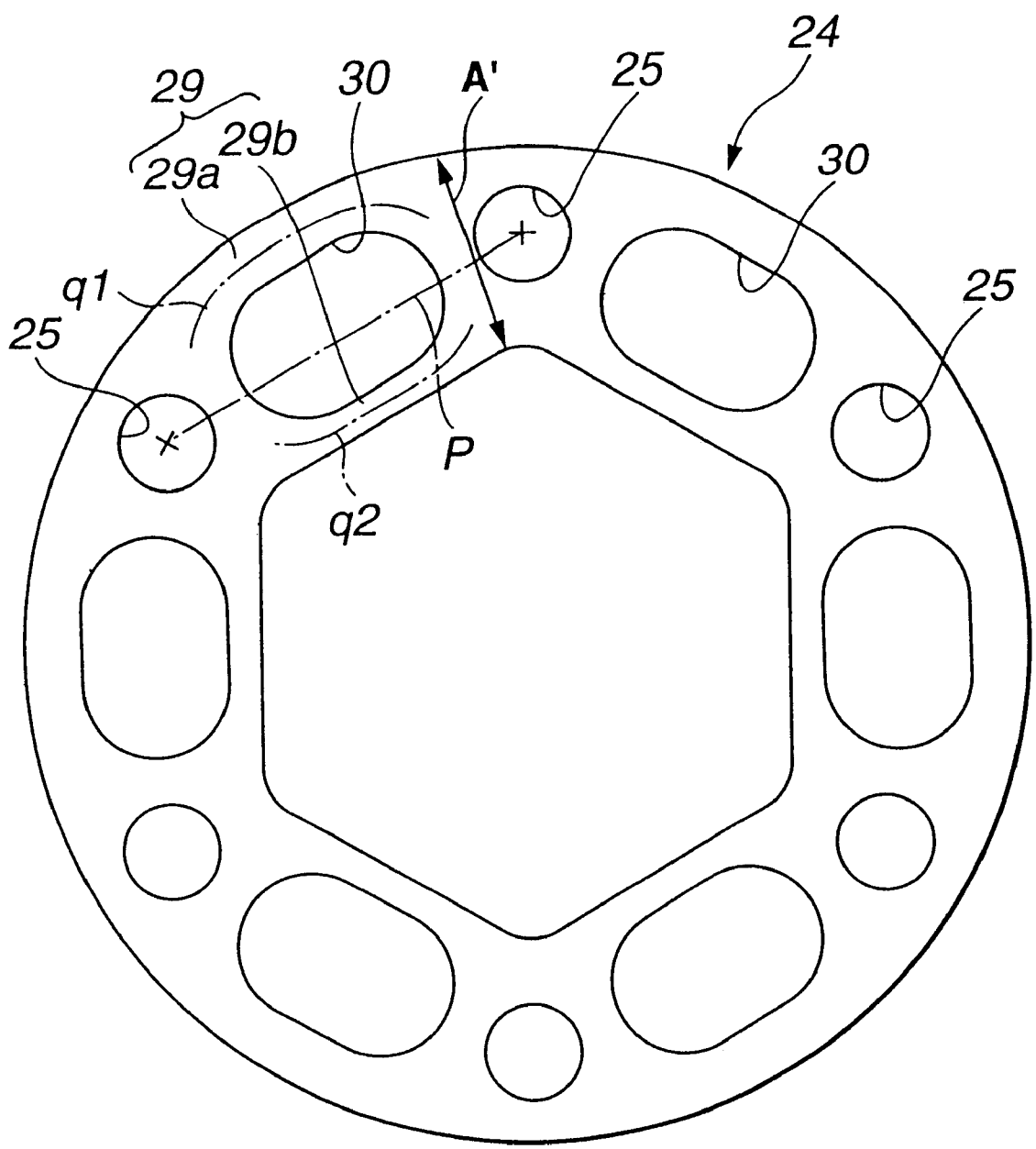
FIG. 1 is a plan view illustrating a first embodiment of a substantially annular plate used in a shaft coupling of the invention.
Figure 2:
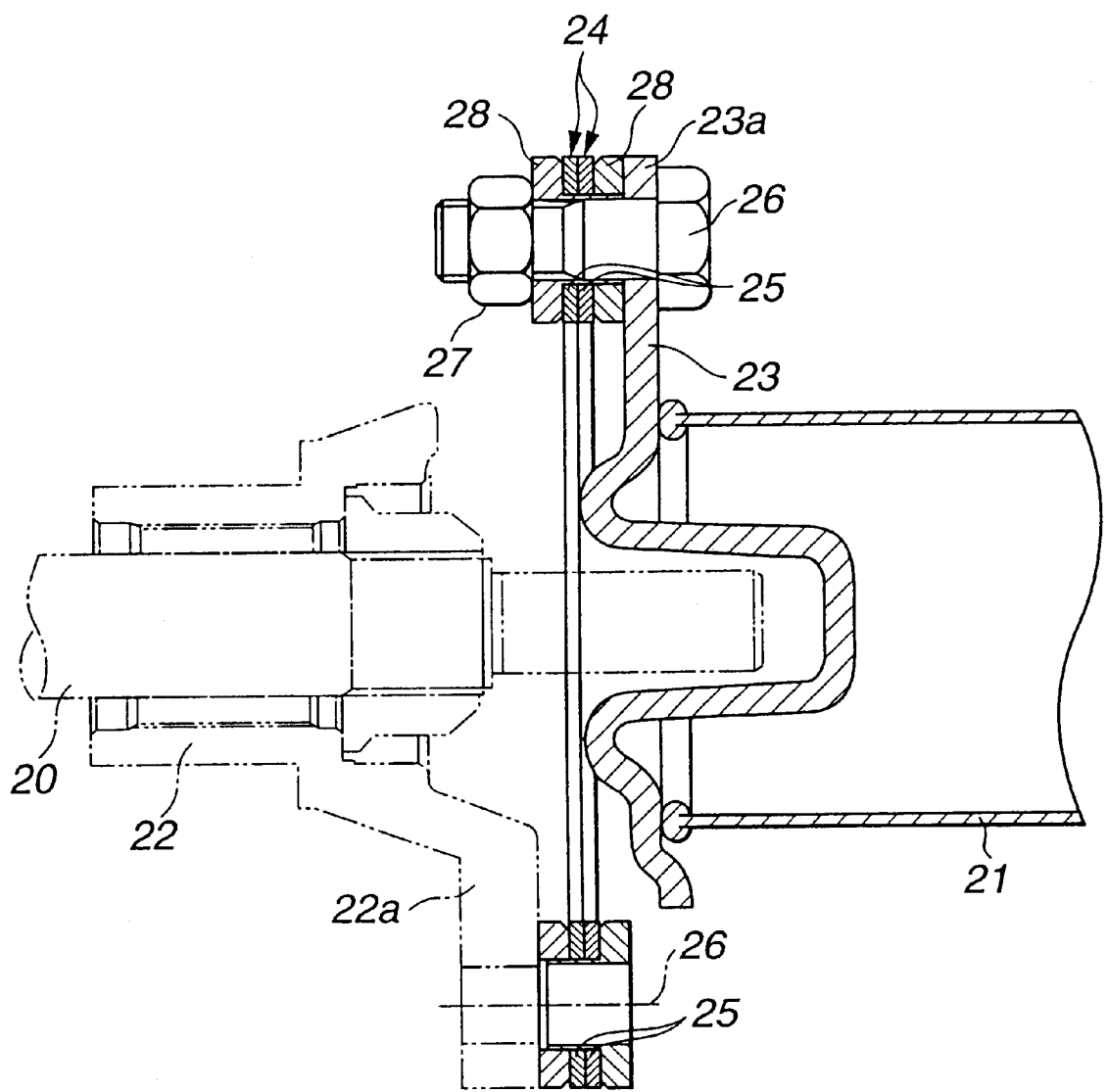
FIG. 2 is a longitudinal cross-sectional view illustrating the shaft coupling of the embodiment installed between power-transmitting input and output shafts.

Referring now to the drawings, particularly to FIGS. 1 and 2, the flexible shaft coupling of the first embodiment is exemplified in a power-transmission shaft coupling provided between an output shaft 20 (a first shaft) of a transmission and one axial end of a propeller shaft 21 (a second shaft). A forged yoke 22 is connected to one axial end of transmission shaft 20 (output). On the other hand, a pressed yoke 23 is fixedly connected to the axial end of propeller shaft 21 (input) by way of welding. Forged yoke 22 has a first group of trifurcated, equidistant-spaced branched arms (22a, 22a, 22a), circumferentially 120°-spaced with each other. Pressed yoke 23 has a second group of trifurcated, equidistant-spaced branched arms (23a, 23a, 23a), circumferentially 120°-spaced with each other. Outer peripheral end portions of the first group of branched arms (22a, 22a, 22a) serve as output-shaft coupled portions, whereas outer peripheral end portions of the second group of branched arms (23a, 23a, 23a) serve as input-shaft coupled portions. As shown in FIG. 2, the first group of branched arms (22a, 22a, 22a) alternate with the second group of branched arms (23a, 23a, 23a), through substantially annular, two metal plates (24, 24) coaxially placed side by side between the first and second groups of branched arms. That is, yokes 22 and 23 are properly flexibly connected to or coupled with each other via the substantially annular two metal plates (24, 24) being in contact with each other. The annular metal plates (24, 24) act to transmit power (torque) between closely coupled parts, namely the first group of branched arms of yoke 22 and the second group of branched arms of yoke 23. The flexible shaft coupling of the first embodiment is comprised of mainly by two yokes 22 and 23 respectively fixedly connected to the first and second shafts, and two annular metal plates (24, 24). As clearly shown in FIG. 1, each of substantially annular metal plates (24, 24) is formed with six equidistant-spaced shaft-coupling mounting holes, simply six bolt holes (25, 25, 25, 25, 25, 25), concentrically arranged and circumferentially 60°-spaced with each other with respect to the central axis of annular metal plate 24. The previously-noted first (22a, 22a, 22a) and second (23a, 23a, 23a) groups of branched arms are closely coupled with each other through the two metal plates (24, 24) placed between them by means of bolts 26 and nuts 27 (serving as fastening means), so that the first group of branched arms (22a, 22a, 22a) alternate with the second group of branched arms (23a, 23a, 23a) in the circumferential direction. Actually, as can be seen from the cross section of FIG. 2, when assembling, first, the bolts are inserted through the respective bolt holes (coupling mounting holes) in each annular metal plate 24, and then each of the bolts is tightened by applying a specified torque to the nut, placing a first washer 28 between the associated branched arm 23a of yoke 23 and the annular metal plate set (24, 24), and simultaneously placing a second washer 28 between the nut 27 and the annular metal plate set (24, 24). Each of annular metal plates (24, 24) is properly thin-walled.

As shown in FIG. 1, the outer peripheral wall portion or external edged portion of properly thin-walled annular metal plate 24 is circular in shape, whereas the inner peripheral wall portion or internal edged portion of thin-walled annular metal plate 24 is substantially regular hexagonal in shape, so that six vertexes of the substantially regular hexagon are radially aligned with the respective bolt holes (25, 25, 25, 25, 25, 25). A coupling arm portion 29 extending between two adjacent bolt holes (25, 25) is formed with an elongated lightening hole 30. Elongated lightening hole 30 is formed in the coupling arm portion 29 in such a manner as to pass through a straight line segment P (indicated by the hypothetical line of FIG. 1) between and including the axes or centers of the two adjacent bolt holes (25, 25), and to extend in the direction of straight line segment P. Elongated lightening hole 30 serves to divide the coupling arm portion 29 into a first, radial-outward arm portion 29a placed outside of the hypothetical line segment P, and a second, radial-inward arm portion 29b placed inside of the hypothetical line segment P. As shown in FIG. 1, first arm portion 29a is somewhat radially outwardly curved, while second arm portion 29b is substantially parallel to the straight hypothetical line segment P. Circumferential ends of elongated lightening hole 30 are both formed as circular-arc-shaped portions that reduce a stress concentration and thus enhance the durability of each annular metal plate 24. Owing to the shape and geometry of annular metal plate 24 shown in FIG. 1, the total radial width of coupling arm portion 29 (that is, the sum ($A=A_1+A_2$) of the radial width $A_1$ of first arm portion 29a and the radial width $A_2$ of second arm portion 29b) is dimensioned to be narrower than a radial width A' between the substantially regular hexagonal internal edged portion of annular metal plate 24 and the circular external edged portion of annular metal plate 24 in the peripheral region of bolt hole 25. In FIG. 1, the upper curved phantom line $q_1$ denotes a neutral axis of first arm portion 29a, while the lower curved phantom line $q_2$ denotes a neutral axis of second arm portion 29b. As can be appreciated from the plan view of FIG. 1, upper curved phantom line $q_1$ is radially outwardly curved and passes above the straight hypothetical line segment P, whereas lower curved phantom line $q_2$ is radially inwardly curved and passes below the straight hypothetical line segment P. As a result, the length of each of upper curved phantom line $q_1$ (corresponding to the length of first arm portion 29a) and lower curved phantom line $q_2$ (corresponding to the length of second arm portion 29b) can be dimensioned to be longer than the length of straight hypothetical line segment P, that is, $q_1 > P$, and $q_2 > P$. In manufacturing the annular metal plate 24 shown in FIG. 1, elongated lightening holes (30, 30, 30, 30, 30, 30), and the substantially regular hexagonal internal edged portion of annular metal plate 24 are machined by way of pressing at the same time when pressing six bolt holes (25, 25, 25, 25, 25, 25). Annular metal plate 24 having the substantially regular hexagonal central hole, bolt holes 25, and elongated lightening holes 30 can be produced by pressing only once. This eliminates the necessity of subsequent machining (a plurality of pressing processes), thereby reducing production costs. As discussed above, the annular metal plate 24 of the shaft coupling of the first embodiment has a plurality of elongated lightening holes 30. As a consequence, the total radial width ($A=A_1+A_2$) of coupling arm portion 29 of annular metal plate 24 can be dimensioned to be narrower relatively. Additionally, the length of each of first and second arm portions (29a, 29b) can be set or dimensioned to be longer than the distance between two adjacent bolt holes (25, 25). Owing to the synergistic effect as described above, the axial rigidity (or axial flexural stiffness) of coupling arm portion 29 can be effectively satisfactorily reduced. In other words, the shaft coupling of the first embodiment can provide a properly tuned axial flexibility, while ensuring a predetermined high stiffness for rotational directions. Therefore, the shaft coupling of the first embodiment can elastically effectively absorb shock and vibrations for axial directions, thus enhancing the vibration dampening effect. Additionally, each of annular metal plates (24, 24) of the shaft coupling of the first embodiment is properly thin-walled, but not thin-walled more excessively than need be. According to the structure of the shaft coupling of the first embodiment, it is unnecessary to undesirably large-size the diameter of the annular metal plate in order to provide the proper axial flexibility, and thus there is a less possibility of increased wear of the peripheral portion of each bolt hole 25, thus ensuring the enhanced durability of the shaft coupling and long coupling life, down-sized shaft coupling, and high torque-transmission efficiency and high axial shock/vibration dampening performance. Furthermore, in the shaft coupling of the first embodiment of FIG. 1, by means of the elongated lightening hole 30, the coupling arm portion 29 is divided into two radially-spaced portions, namely the first arm portion 29a placed outside of the hypothetical line segment P and the second arm portion 29b placed inside of the hypothetical line segment P. By the coupling arm portion 29 composed of first and second arm portions 29a and 29b, in the shaft coupling structure of the first embodiment of FIG. 1 there is a less possibility of buckling of coupling arm portion 29, caused by application of a moment occurring when coupling arm portion 29 is in tension owing to a tensile force acting between the two adjacent bolt holes (25, 25) during normal power transmission in a positive torque-transmission direction or caused by application of a moment occurring when coupling arm portion 29 is in compression owing to a compressive force acting between the two adjacent bolt holes (25, 25) during the normal power transmission, in particular in comparison with a shaft coupling structure shown in FIGS. 7 through 9 (described hereunder).

Figure 7:
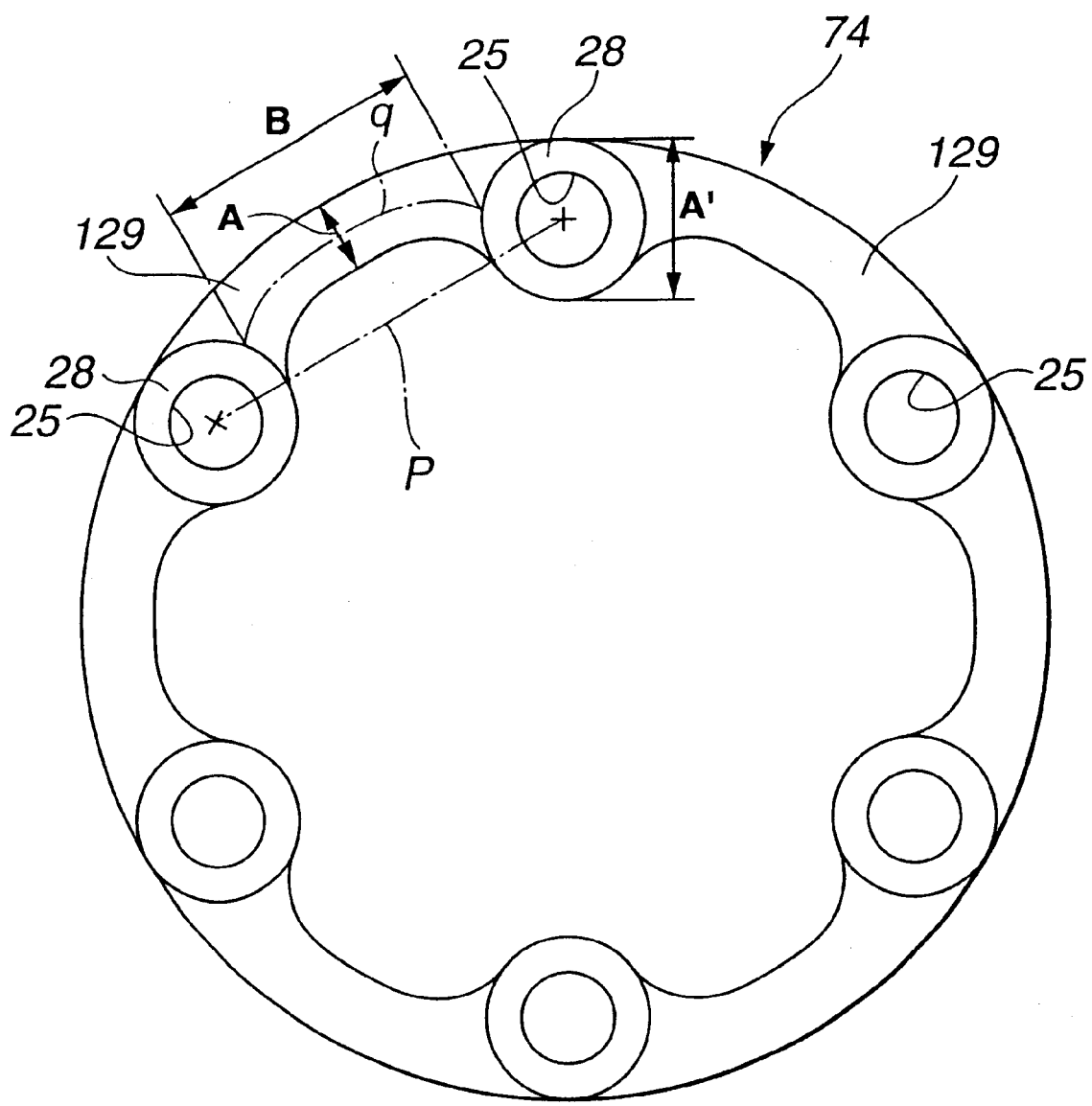
FIG. 7 is a plan view illustrating a sixth embodiment of a substantially annular plate used in the shaft coupling of the invention.
Figure 8:
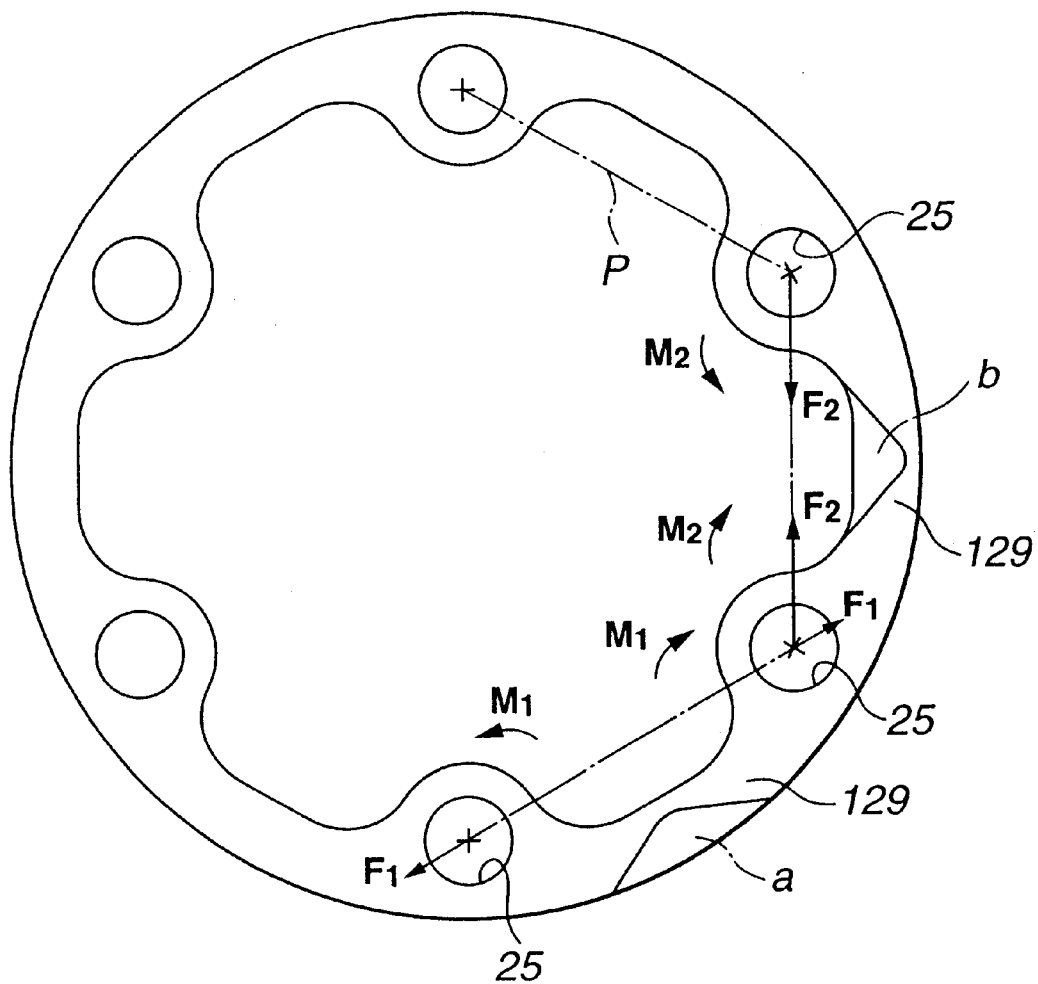
FIG. 8 is a plan view illustrating analytical mechanics for forces ($F_1$, $F_2$) and moments ($M_1$, $M_2$) acting on the annular plate of the sixth embodiment of FIG. 7.
Figure 9:
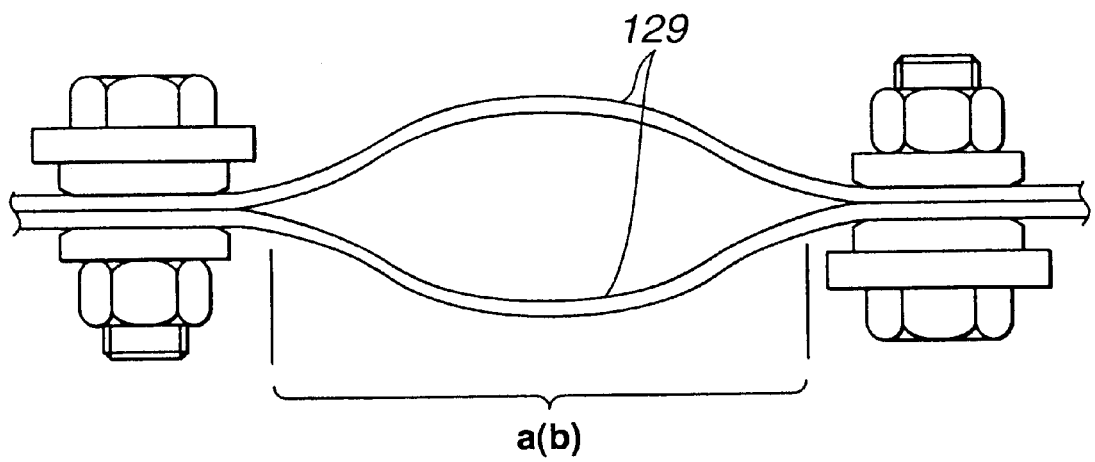
FIG. 9 is a side view showing two deformed portions a and b indicated by the phantom line in FIG. 8.
Figure 10:
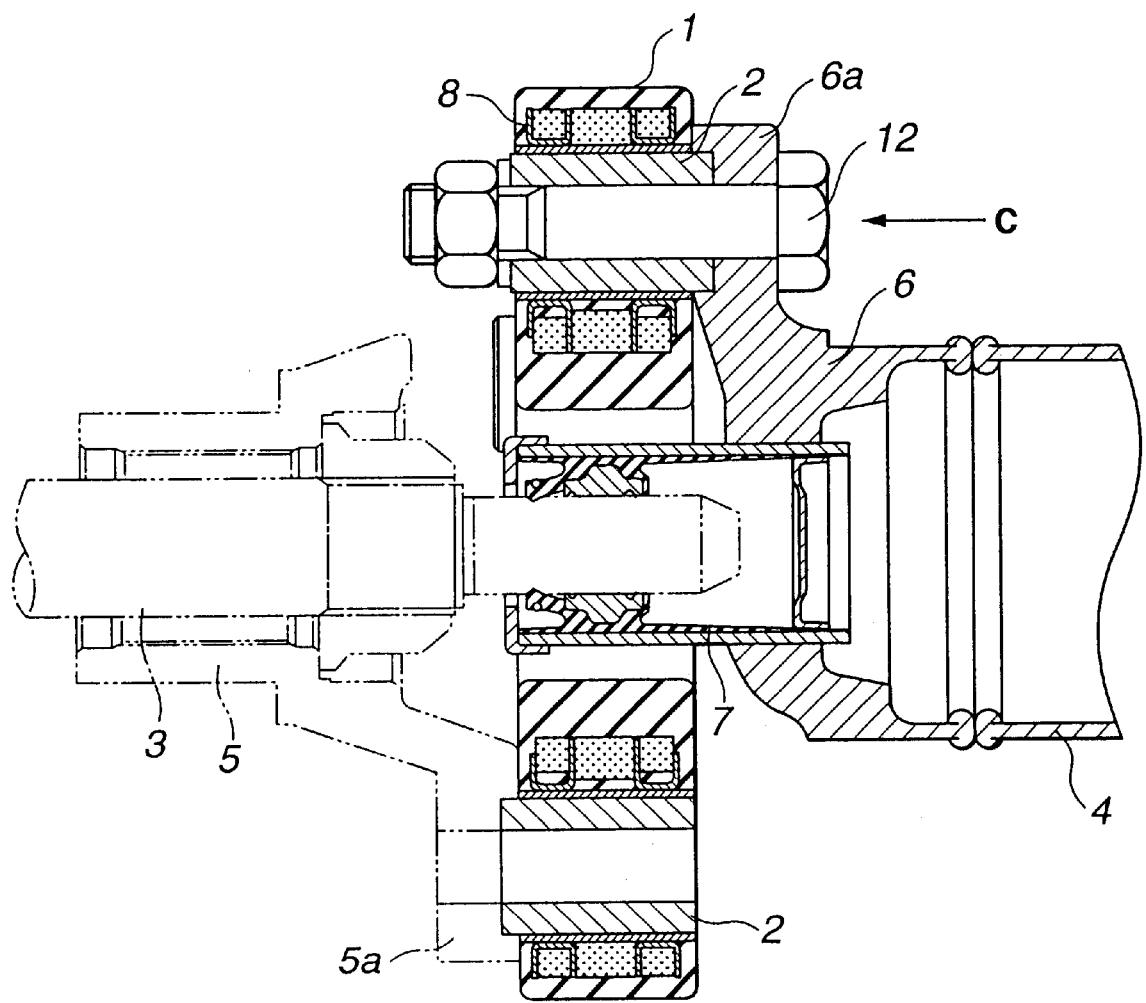
FIG. 10 is a longitudinal cross-sectional view illustrating one conventional shaft coupling made of elastic rubber material, installed between the first and second groups of branched arms.
Figure 11:
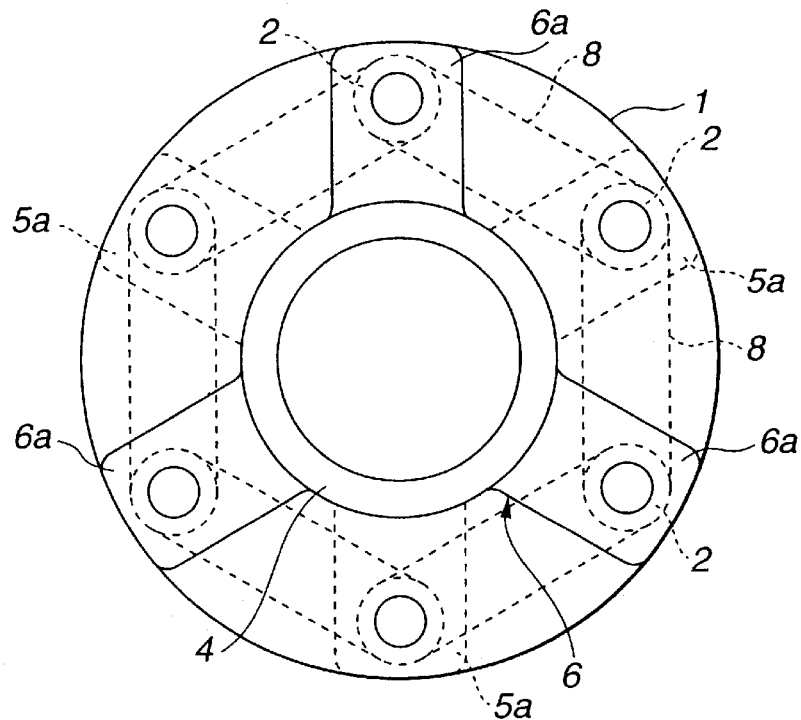
FIG. 11 is a plan view of the conventional shaft coupling, taken in the direction indicated by the arrow C of FIG. 10.
Figure 12:
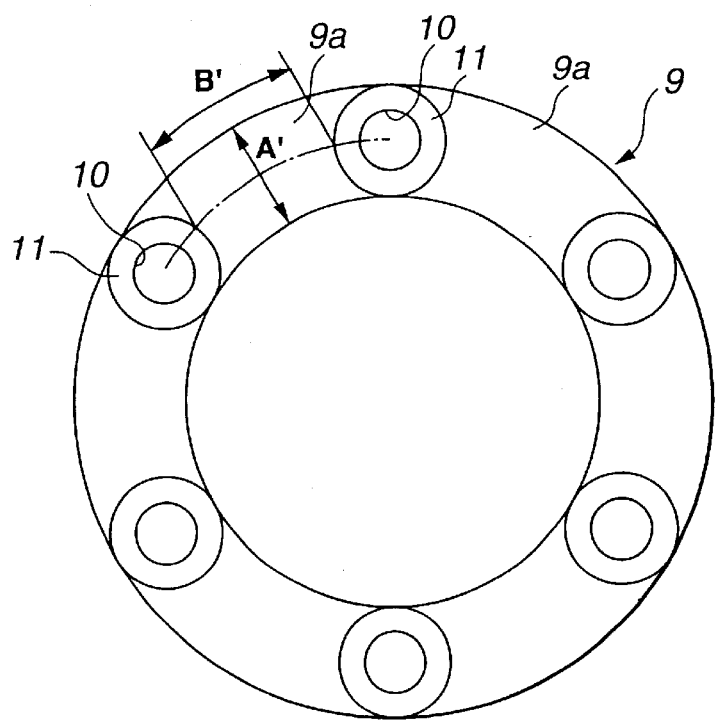
FIG. 12 is a plan view illustrating a substantially annular plate of the other conventional shaft coupling.

Referring now to FIGS. 7 through 9, there is shown the shaft coupling of the sixth embodiment. For the purpose of comparison of the first and sixth embodiments, the same reference signs used to designate elements in the first embodiment shown in FIG. 1 will be applied to the corresponding elements used in the sixth embodiment shown in FIG. 7. In the shaft coupling of the sixth embodiment of FIG. 7, a coupling arm portion 129 extending between two adjacent bolt holes (25, 25) has no lightening hole. Instead of forming such a lightening hole, in the shaft coupling of the sixth embodiment of FIG. 7, a coupling-arm-portion radial width A itself is dimensioned to be narrower than a radial width A' between the circumferentially continuously-undulated or internal flower-shaped edged portion of an annular metal plate 74 and the circular external edged portion of annular metal plate 74 in the peripheral region of bolt hole 25. In providing the comparatively narrow radial width A of coupling arm portion 129, that is, in forming the internal flower-shaped edged portion of annular metal plate 74, the annular metal plate 74 is cut out in a substantially arc-shaped fashion at its six different inner peripheral portions. As clearly shown in FIG. 7, the arc-shaped cutout of annular metal plate 74 is placed outside of the straight line segment P (indicated by the hypothetical line of FIG. 7) between and including the axes or centers of the two adjacent bolt holes (25, 25), in the radial direction. In FIG. 7, the curved phantom line q denotes a neutral axis of the comparatively narrow coupling arm portion 129. As a result of the arc-shaped cutout, coupling arm portion 129 is shaped and dimensioned so that its neutral axis q is radially outwardly curved with respect to the hypothetical line segment P. Therefore, almost all of the coupling arm portion 129 is formed outside of the hypothetical line segment P in the radial direction. According to the shaft coupling structure of the sixth embodiment as discussed above, the radial width A of each coupling arm portion 129 is set or dimensioned to be narrower than the radial width A' between the circumferentially continuously-undulated or internal flower-shaped edged portion of annular metal plate 74 and the circular external edged portion of annular metal plate 74 in the peripheral region of bolt hole 25. Also, the length of the comparatively narrow curved coupling arm portion 129 (corresponding to the length of the curved phantom line q) is set or dimensioned to be longer than the length of straight line segment P between the axes or centers of the bolt holes 25. In comparison between annular metal plate 74 of the shaft coupling of the sixth embodiment of FIG. 7 and annular metal plate 9 of the conventional shaft coupling of FIG. 12, the radial width A of coupling arm portion 129 of annular metal plate 74 is dimensioned to be narrower than the radial width A' of coupling arm portion 9a of annular metal plate 9, that is, A<A'. In addition, a length B of radially outwardly curved coupling arm portion 129 of annular metal plate 74 is dimensioned to be longer than a circumferential length B of coupling arm portion 9a of annular metal plate 9 of the conventional shaft coupling of FIG. 12, that is, B>B'. In manufacturing the annular plate 74 shown in FIG. 7, the previously-noted internal flower-shaped edged portion of annular metal plate 74 can be machined or pressed simultaneously when pressing the annular metal plate to produce the six bolt holes (25, 25, 25, 25, 25, 25). Therefore, the annular metal plate 74 can be manufactured by pressing only once, thereby eliminating the necessity of subsequent machining (a plurality of pressing processes), and thus reducing production costs. As can be appreciated from the above, the shaft coupling of the sixth embodiment of FIGS. 7 through 9 can provide almost the same operation and effects as those of the first embodiment of FIG. 1, that is, the properly reduced axial rigidity (proper axial flexibility or properly tuned elastic deformation) of coupling arm portion 129, enhanced durability and down-sizing of the shaft coupling, and enhanced axial shock/vibration dampening performance. In comparison with the shaft coupling of the first embodiment of FIG. 1, the shaft coupling of the sixth embodiment of FIG. 7 is simple in structure. On the other hand, from a viewpoint of a ultimate torque capacity (or a buckling torque capacity) of the coupling arm portions put side by side, the shaft coupling of the sixth embodiment of FIG. 7 is inferior to that of the first embodiment of FIG. 1, as will be fully described later in reference to FIGS. 8 and 9.

In the shown embodiment, the shaft coupling of the sixth embodiment of FIG. 7 is shaped or dimensioned so that the neutral axis q of coupling arm portion 129 is radially outwardly curved with respect to the hypothetical line segment P, so as to provide the increased coupling arm length (B>B') and reduced radial width (A<A'). For the same purposes, instead of radially outwardly curving the neutral axis q of coupling arm portion 129 with respect to the hypothetical line segment P, the shaft coupling may be designed or shaped so that the neutral axis q of coupling arm portion 129 is radially inwardly curved with respect to hypothetical line segment P. However, from the viewpoint of more increased coupling arm length, it is preferable that the neutral axis q of coupling arm portion 129 is radially outwardly curved with respect to the hypothetical line segment P. In the first and sixth embodiments, in order to relatively reduce the magnitude of a stress produced in the coupling arm portion of the annular metal plate, the radial width A (or the total radial width A corresponding to the sum $(A_1+A_2)$ of the radial width $A_1$ of the first arm portion and the radial width $A_2$ of the second arm portion) of the coupling arm portion is preset or dimensioned to be narrower than the radial width A' of the peripheral region of each of the bolt holes 25. Alternatively, the thickness of the coupling arm portion may be locally or partially thinned as compared to that of the peripheral region of each of the bolt holes 25. In this case, it is possible to effectively reduce the axial rigidity of the coupling arm portion, without lowering the durability of the shaft coupling in the peripheral region of each of the bolt holes and increasing the size of the annular metal plate.

Referring now to FIGS. 8 and 9, there is shown the analytical mechanics for forces $(F_1, F_2)$ and moments $(M_1, M_2)$ acting on the annular metal plate 74 of the sixth embodiment. During power transmission or torque transmission, a moment $M_1$ occurs when coupling arm portion 129 is in tension owing to a tensile force $F_1$ acting between the axes of the two adjacent bolt holes (25, 25), or a moment $M_2$ occurs when coupling arm portion 129 is in compression owing to a compressive force $F_2$ acting between the axes of the two adjacent bolt holes (25, 25). Assuming that the shaft coupling is formed so that the neutral axis q of coupling arm portion 129 is radially outwardly curved with respect to the hypothetical line segment P as shown in FIG. 8, the moments $(M_1, M_1)$ produced owing to the tensile force pair $(F_1, F_1)$ acting between the axes of a first pair of two adjacent bolt holes, act at the two annular metal plates (129, 129) coaxially put side by side, so that one of the two adjacent bolt holes (25, 25) is moved away from the other with respect to a substantially midpoint of coupling arm portion 129. As a result, as denoted by "a" in FIG. 8, undesirable buckling (unstable displacement) of a radial-outward arm portion of the substantially midpoint of coupling arm portion 129 is caused by the moments $(M_1, M_1)$ of the tensile force pair $(F_1, F_1)$ about the axes of the two adjacent bolt holes, and therefore the radial-outward arm portion of the middle of coupling arm portion 129 of one of the two annular metal plates put side by side and the radial-outward arm portion of the middle of coupling arm portion 129 of the other annular plate are axially partly spaced with respect to each other. On the other hand, the moments $(M_2, M_2)$ produced owing to the compressive force pair $(F_2, F_2)$ acting between the axes of a second pair of two adjacent bolt holes (a combination of the two adjacent bolt holes angularly shifted counterclockwise by 60 degrees from the first pair), act at the two annular metal plates (129, 129) coaxially put side by side, so that one of the two adjacent bolt holes (25, 25) is moved towards the other with respect to a substantially midpoint of coupling arm portion 129. As a result, as denoted by "b" in FIG. 8, undesirable buckling (unstable displacement) of a radial-inward arm portion of the substantially midpoint of coupling arm portion 129 is caused by the moments $(M_2, M_2)$ of the compressive force pair $(F_2, F_2)$ about the axes of the two adjacent bolt holes, and as a result the radial-inward arm portion of the middle of coupling arm portion 129 of one of the two annular metal plates put side by side and the radial-inward arm portion of the middle of coupling arm portion 129 of the other annular plate are axially partly spaced with respect to each other. In contrast to the above, in the shaft coupling of the first embodiment shown in FIG. 1, coupling arm portion 29 is divided into two radially-spaced arm portions, namely first and second arm portions 29a and 29b. In such a case, when the moments ($M_1$, $M_1$) produced owing to the tensile load pair ($F_1$, $F_1$) as shown in FIG. 8 act at the coupling arm portion 29 (composed of first and second arm portions 29a and 29b) of the shaft coupling of the first embodiment of FIG. 1, the deformation of one of first and second arm portions 29a and 29b can be effectively suppressed by the other arm portion, thus avoiding the occurrence of undesirable buckling (unstable displacement of coupling arm portion 29 of annular metal plate 24 of the shaft coupling of the first embodiment of FIG. 1). Therefore, in the shaft coupling of the first embodiment, it is possible to prevent noise arising from reversing action of the buckling section, and to avoid dart and debris from being caught or pinched between annular metal plates (24, 24). Elongated lightening hole 30 formed or pressed in coupling arm portion 29 of annular metal plate 24 of the shaft coupling of the first embodiment results in a decrease in the rigidity of annular metal plate 24 for rotational directions (clockwise and counterclockwise directions). Such a decrease in the rigidity of annular metal plate 24 can be compensated for by properly increasing the number of annular metal plates 24 coaxially arranged with each other.

Figure 3:
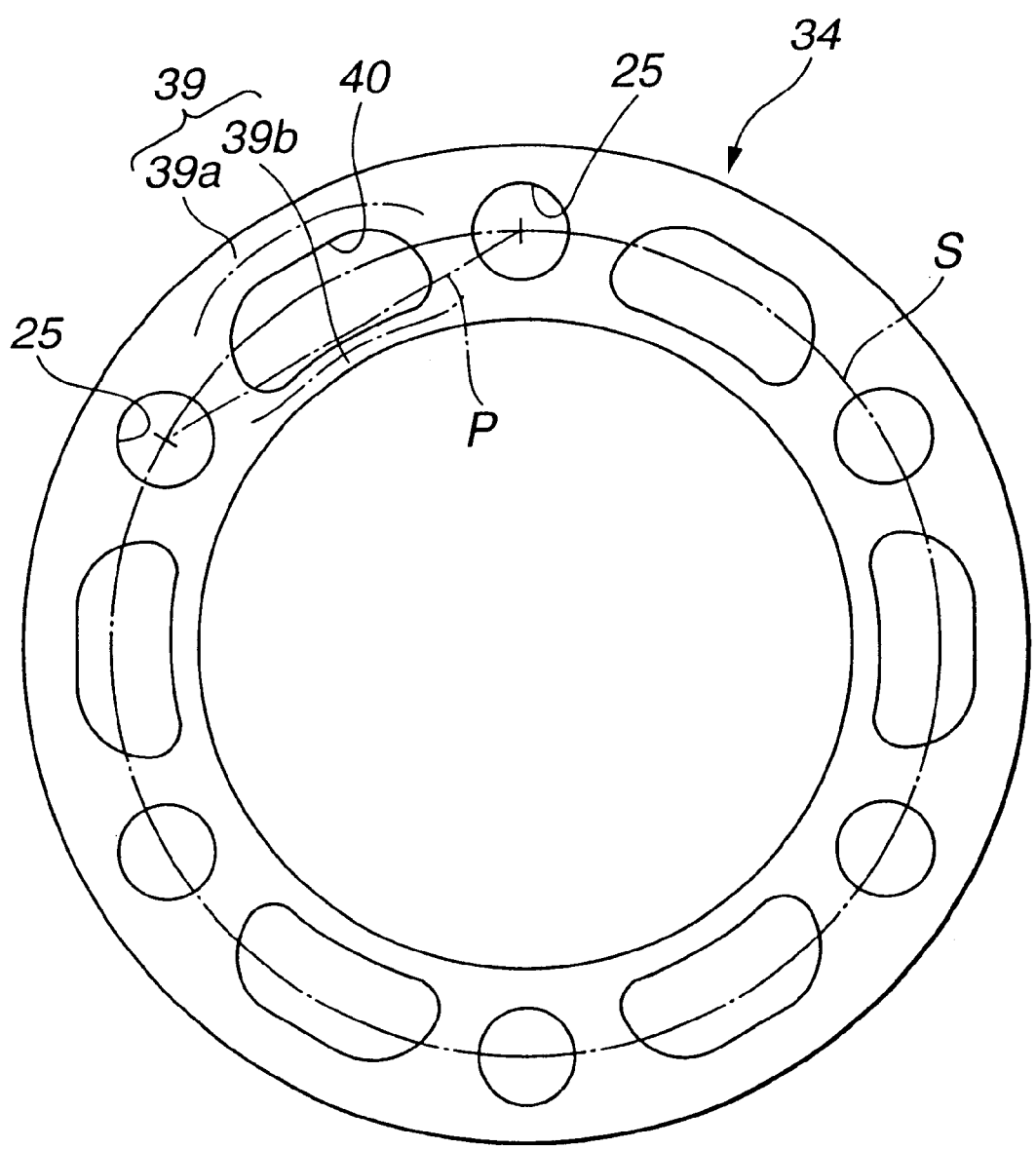
FIG. 3 is a plan view illustrating a second embodiment of a substantially annular plate used in the shaft coupling of the invention.

Referring now to FIG. 3, there is shown the shaft coupling of the second embodiment. In an annular metal plate 34 of the shaft coupling of the second embodiment, a coupling arm portion 39 extending between two adjacent bolt holes (25, 25) is formed with a circumferentially elongated lightening hole 40. Circumferentially elongated lightening hole 40 is formed in the coupling arm portion 39 such that the circumferentially elongated lightening hole 40 is dimensioned and formed into a circular-arc shape concentrically with respect to a pitch circle S (or a mounting-bolt circle) passing through the centers of bolt holes (25, 25, 25, 25, 25, 25). Additionally, the circular outer peripheral wall portion or external edged portion of annular metal plate 34 is shaped to be concentric to the pitch circle S, whereas the circular inner peripheral wall portion or internal edged portion of annular metal plate 34 is shaped to be concentric to the pitch circle S. In the same manner as the elongated lightening hole 30 of annular metal plate 24 of the shaft coupling of the first embodiment of FIG. 1, circumferentially elongated lightening hole 40 of annular metal plate 34 of the shaft coupling of the second embodiment of FIG. 3 serves to divide the coupling arm portion 39 into a first, radial-outward arm portion 39a extending substantially parallel to the pitch circle S and placed outside of the straight hypothetical line segment P, and a second, radial-inward arm portion 39b extending substantially parallel to the pitch circle S and placed inside of the hypothetical line segment P. Both circumferential ends of circumferentially elongated lightening hole 40 are also formed as circular-arc-shaped portions that reduce a concentration of stress and thus enhance the durability of each annular metal plate 34. As discussed above, basically, the shaft coupling of the second embodiment (FIG. 3) can provide the same operation and effects as those of the first embodiment (FIG. 1). Additionally, each of circumferentially elongated lightening holes 40 is formed into a circular-arc shape, and each elongated lightening hole 40, the circular outer peripheral wall portion of annular metal plate 34, and the circular inner peripheral wall portion of annular metal plate 34 are arranged concentrically with respect to the pitch circle S. Therefore, around the circumference, the radial width of first arm portion 39a is fixed to a predetermined width, while the radial width of second arm portion 39b is fixed to a predetermined width. In each of first and second arm portions 39a and 39b, there is no problem of a locally mechanically weakened section having a relatively narrow radial width. This ensures the smooth flow of stress and strain in the peripheral region of circumferentially elongated lightening hole 40. The shape and geometry of annular metal plate 34 having circumferentially elongated lightening hole 40 are advantageous to a mechanical strength. In more detail, it is possible to reduce the inside diameter of annular metal plate 34, keeping a desired mechanical strength of the annular metal plate. In the shaft coupling of the second embodiment of FIG. 3, it is possible to provide a greater central circular space in the annular metal plate 34. Due to such a greater central circular space, there is a less risk of interfering the inner periphery of the annular metal plate with the other components. With the greater central circular space, it is possible to effectively use the inner peripheral side of annular metal plate 34.

Figure 4:
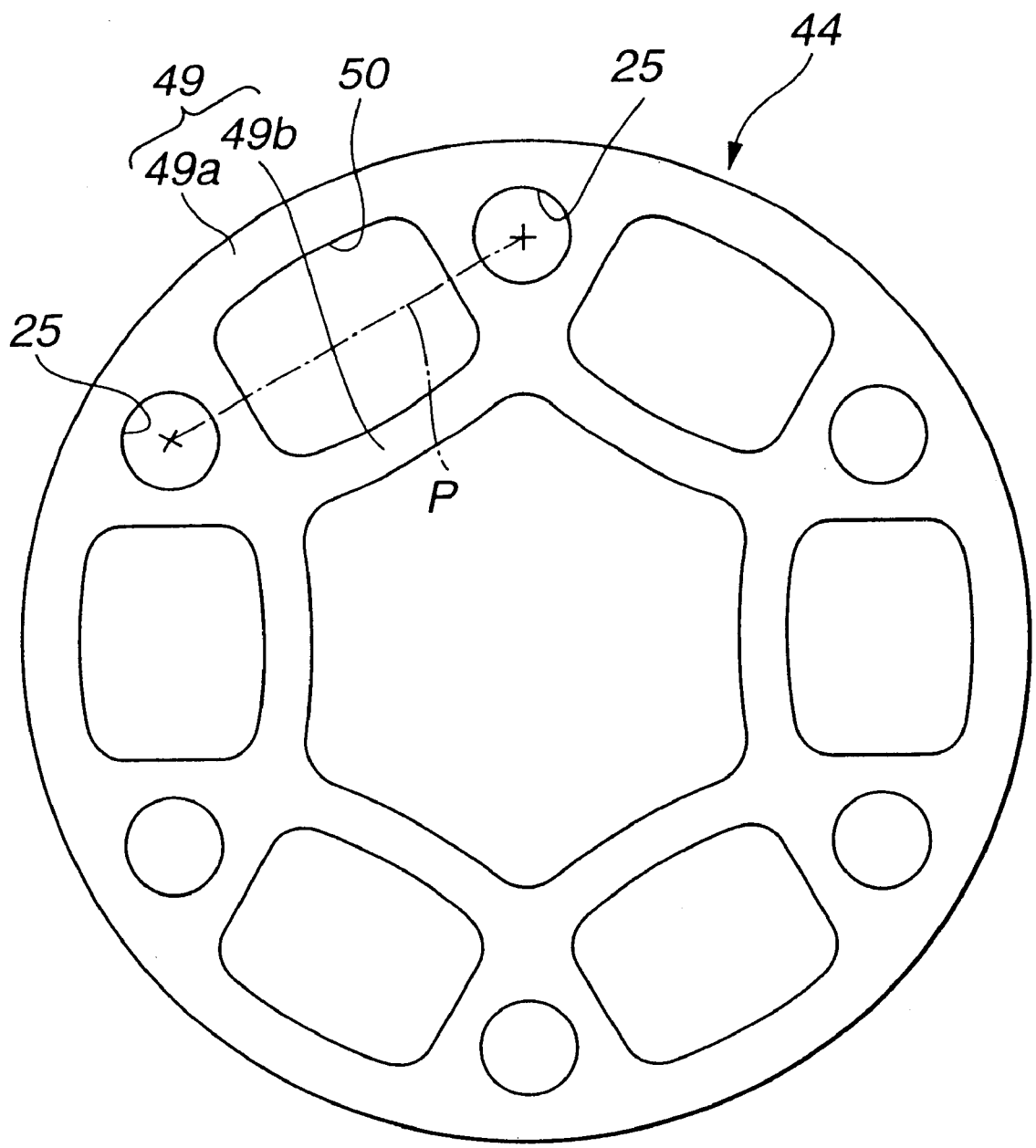
FIG. 4 is a plan view illustrating a third embodiment of a substantially annular plate used in the shaft coupling of the invention.

Referring now to FIG. 4, there is shown the shaft coupling of the third embodiment. The shape of an annular metal plate 44 of the shaft coupling of the third embodiment of FIG. 4 is somewhat similar to that of the annular metal plate 24 of the shaft coupling of the first embodiment of FIG. 1, in that a coupling arm portion 49 of annular metal plate 44 is divided into two radially-spaced portions, i.e., first and second arm portions 49a and 49b, by way of a lightening hole 50, and that the inner peripheral wall portion or internal edged portion of annular metal plate 44 is substantially regular hexagonal in shape so that six vertexes of the substantially regular hexagon are radially aligned with the respective bolt holes (25, 25, 25, 25, 25, 25). In the first embodiment, the first and second arm portions 29a and 29b are unsymmetrical with respect to the straight line segment P. On the other hand, in the third embodiment of FIG. 4, the first arm portion 49a is formed as a radially outwardly curved arm portion, whereas the second arm portion 49b is formed as a radially inwardly curved arm portion. Additionally, the first and second arm portions 49a and 49b are generally symmetrical with respect to the straight line segment P. In the shaft coupling of the third embodiment of FIG. 4, first and second arm portions 49a and 49b are shaped or formed so that the circumferential length of the first arm portion 49a is substantially identical to that of the second arm portion 49b. Therefore, the symmetrical coupling arm structure shown in FIG. 4 ensures the smooth uniform stress dispersion between first and second arm portions 49a and 49b, when a stress is produced in the coupling arm portion 49 with the coupling arm portion in tension by way of the tensile force $F_1$ acting between the axes of the two adjacent bolt holes (25, 25), or when a stress is produced in the coupling arm portion 49 with the coupling arm portion in compression by way of the compressive force $F_2$ acting between the axes of the two adjacent bolt holes (25, 25). Thus, the shaft coupling of the third embodiment of FIG. 4, eliminates the need to relatively increase the radial dimension of one of the two divided arm portions as compared to the other (see the first arm portion 29a of a radial width greater than the second arm portion 29b in FIG. 1, or see the first arm portion 39a of a radial width greater than the second arm portion 39b in FIG. 3), in order to provide a desired mechanical strength. This contributes to lightening of the shaft coupling. In addition to the above, in the shaft coupling of the third embodiment of FIG. 4, first and second arm portions 49a and 49b are shaped or designed to be generally symmetrical with respect to the straight hypothetical line segment P, and each of first and second arm portions 49a and 49b are formed into a circular-arc shape so that the circumferential length of each of first and second arm portions 49a and 49b is dimensioned to be longer than the length of straight hypothetical line segment P. Thus, the longer first and second arm portions ensure properly reduced axial rigidity. Furthermore, in the shaft coupling structure of the third embodiment of FIG. 4, the second arm portion 49b is shaped to be radially inwardly curved, thereby reducing the moment of inertia of annular metal plate 44 with respect to the axis of annular metal plate 44. The reduced moment of inertia of annular metal plate 44 is suitable for a rotational part.

Figure 5:
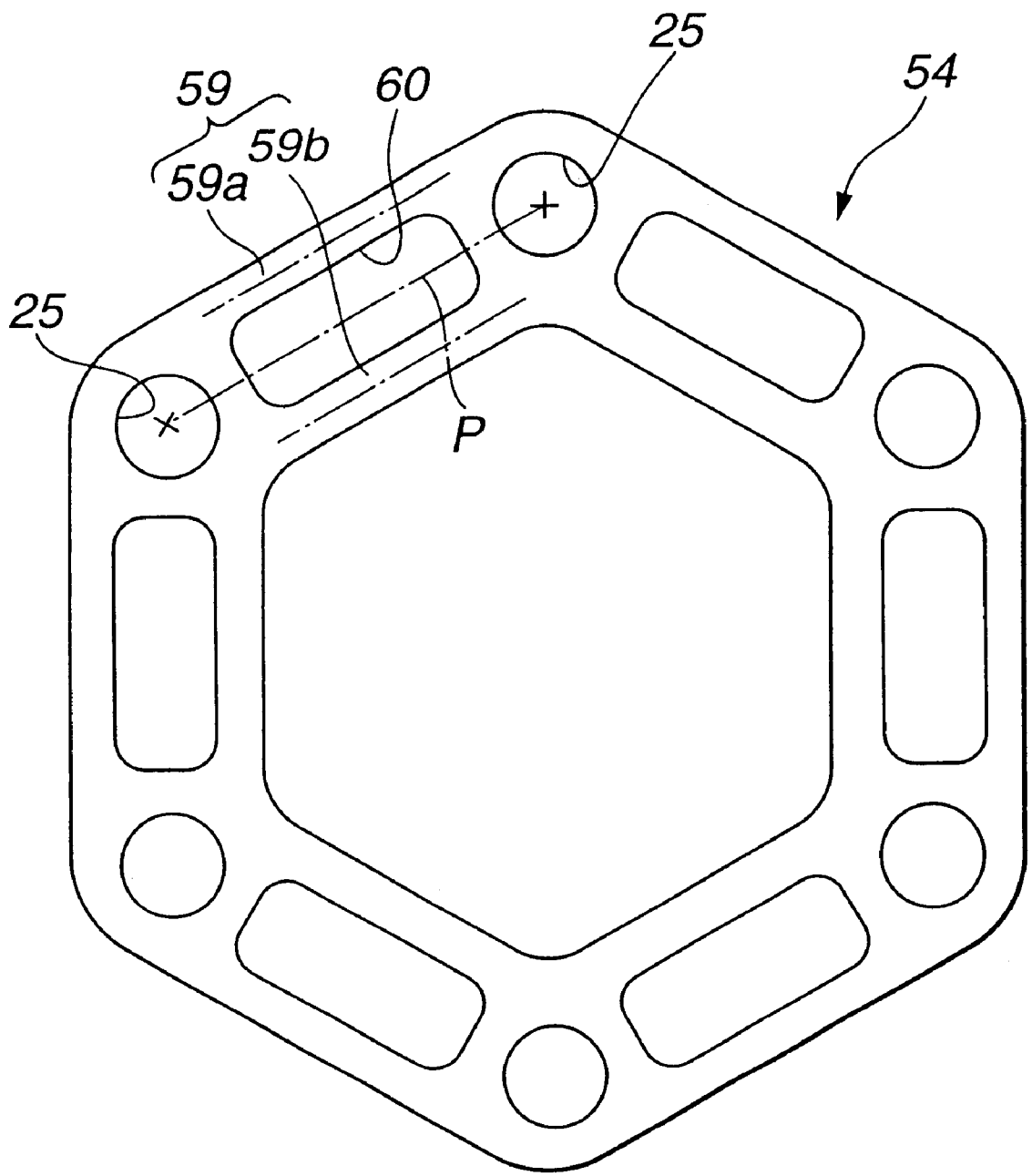
FIG. 5 is a plan view illustrating a fourth embodiment of a substantially annular plate used in the shaft coupling of the invention.

Referring now to FIG. 5, there is shown the shaft coupling of the fourth embodiment. The shape of an annular metal plate 54 of the shaft coupling of the fourth embodiment of FIG. 5 is somewhat similar to that of the annular metal plate 44 of the shaft coupling of the third embodiment of FIG. 4, in that a coupling arm portion 59 of annular metal plate 54 is divided into two radially-spaced portions, i.e., first and second arm portions 59a and 59b, by way of a lightening hole 60, and that the inner peripheral wall portion or internal edged portion of annular metal plate 54 is substantially regular hexagonal in shape so that six vortexes of the substantially regular hexagon are radially aligned with the respective bolt holes, and that the length of the first arm portion 59a is substantially identical to that of the second arm portion 59b. Additionally, in the shaft coupling of the fourth embodiment of FIG. 5, the outer peripheral wall portion or external edged portion of annular metal plate 54 is substantially regular hexagonal in shape so that six vortexes of the substantially regular hexagon are radially aligned with the respective bolt holes, and that both of first and second arm portions 59a and 59b are substantially parallel to the straight hypothetical line segment P between and including the axes or centers of the two adjacent bolt holes (25, 25). Thus, the shaft coupling structure of the fourth embodiment of FIG. 5 can provide the same operation and effects as those of the third embodiment. Additionally, first and second arm portions 59a and 59b of annular metal plate 54 are not curved radially outwardly or radially inwardly, but formed as two radially-spaced, straight parallel arm portions. This further contributes to lightening of the shaft coupling.

Figure 6:
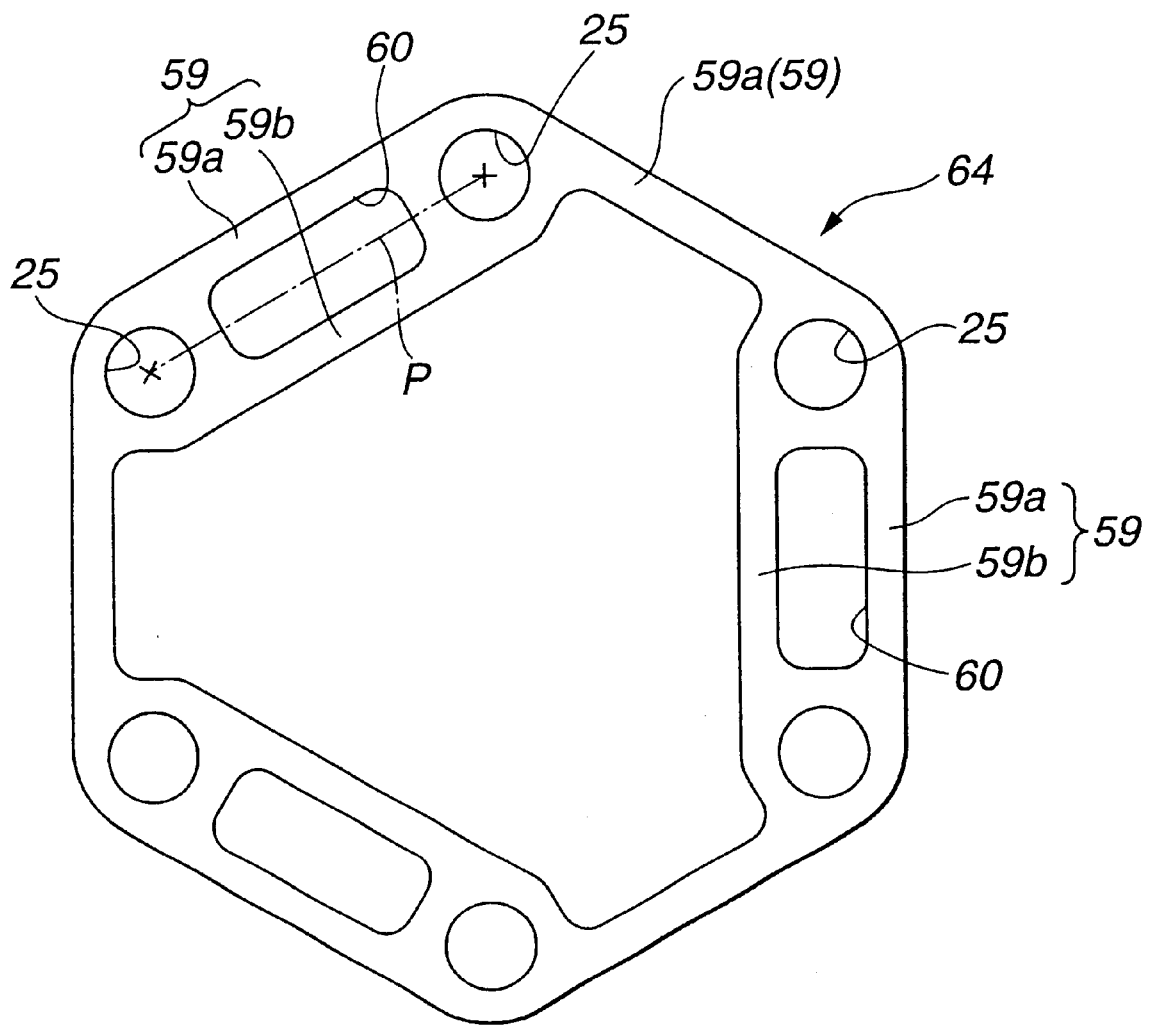
FIG. 6 is a plan view illustrating a fifth embodiment of a substantially annular plate used in the shaft coupling of the invention.

Referring now to FIG. 6, there is shown the shaft coupling of the fifth embodiment. The shape of an annular metal plate 64 of the shaft coupling of the fifth embodiment of FIG. 6 is basically similar to that of the annular metal plate 54 of the shaft coupling of the fourth embodiment of FIG. 5, in that a coupling arm portion 59 of annular metal plate 64 is divided into two radially-spaced portions, i.e., first and second arm portions 59a and 59b, by way of a lightening hole 60, and that the outer peripheral wall portion or external edged portion of annular metal plate 64 is substantially regular hexagonal in shape so that six vortexes of the substantially regular hexagon are radially aligned with the respective bolt holes, and that the length of the first arm portion 59a is substantially identical to that of the second arm portion 59b. Returning to FIG. 8, when considering again the tensile force pair ($F_1$, $F_1$) and compressive force pair ($F_2$, $F_2$), a first group of three coupling arm portions between three pairs of two adjacent bolt holes, each pair 120°-spaced with respect to each other, are in tension by means of the tensile force pair ($F_1$, $F_1$), while a second group of three coupling arm portions between the remaining three pairs of two adjacent bolt holes, each pair 120°-spaced with respect to each other, are in compression by means of the compressive force pair ($F_2$, $F_2$), because forged yoke 22 (the output side) has the first group of trifurcated, equidistant-spaced branched arms (22a, 22a, 22a) and pressed yoke 23 (the input side) has the second group of trifurcated, equidistant-spaced branched arms (23a, 23a, 23a). As can be appreciated from the plan view of FIG. 8, during power transmission in a normal rotational direction, the coupling arm portion relating to a first combination of the lowermost bolt hole (hereinafter referred to as a "first bolt hole") and its adjacent bolt hole (hereinafter referred to as a "second bolt hole") shifted counterclockwise by 60 degrees from the lowermost bolt hole is in tension, the coupling arm portion relating to a second combination of the second bolt hole and its adjacent bolt hole (hereinafter referred to as a "third bolt hole") shifted counterclockwise by 60 degrees from the second bolt hole is in compression, the coupling arm portion relating to a third combination of the third bolt hole and its adjacent bolt hole (hereinafter referred to as a "fourth bolt hole") shifted counterclockwise by 60 degrees from the third bolt hole is in tension, the coupling arm portion relating to a fourth combination of the fourth bolt hole and its adjacent bolt hole (hereinafter referred to as a "fifth bolt hole") shifted counterclockwise by 60 degrees from the fourth bolt hole is in compression, the coupling arm portion relating to a fifth combination of the fifth bolt hole and its adjacent bolt hole (hereinafter referred to as a "sixth bolt hole") shifted counterclockwise by 60 degrees from the fifth bolt hole is in tension, and the coupling arm portion relating to a sixth combination of the sixth bolt hole and its adjacent bolt hole (that is, the first bolt hole) shifted counterclockwise by 60 degrees from the sixth bolt hole is in compression. In particular, during transmission of higher amounts of torque in the normal rotational direction, for example, during straight-ahead accelerating of the vehicle, a greater tensile force (greater tensile stress) is applied to each of the previously-noted first, third and fifth coupling arm portions circumferentially 120°-spaced with respect to each other. On the assumption that the shaft coupling transmits power (torque) mainly by way of tension (or a tensile force) during normal torque transmission, it is preferable to relatively increase a mechanical strength of a first group comprised of the first, third and fifth coupling arm portions in comparison with a mechanical strength of a second group comprised of the second, fourth and sixth coupling arm portions. As can be appreciated from the above, taking into account the difference of buckling load between the coupling arm portion subjected to tension and the coupling arm portion subjected to compression during the normal power transmission, the annular metal plate 64 of the shaft coupling of the fifth embodiment shown in FIG. 6 is constructed by a first group of coupling arm portions (59a,59b; 59a,59b; 59a,59b) circumferentially 120°-spaced with each other and a second group of coupling arm portions (59a; 59a; 59a) circumferentially 120°-spaced with each other. As clearly shown in FIG. 6, the first group of coupling arm portions (59a,59b; 59a,59b; 59a,59b) and the second group of coupling arm portions (59a; 59a; 59a) alternate with each other. Note that only the coupling arm portion of the first group has the second arm portion 59b, but the coupling arm portion of the second group has no second arm portion. That is, in the shaft coupling of the fifth embodiment of FIG. 6, mainly taking into account power-transmitting operation in a normal-rotational direction, in order to relatively increase the mechanical strength of the coupling arm portion subjected to tension, each of the coupling arm portions contained in the first group is comprised of first and second arm portions 59a and 59b, whereas each of the coupling arm portion contained in the second group is comprised of first arm portion 59a only. As a consequence, the shaft coupling of the fifth embodiment of FIG. 6 is able to reconcile or balance two contradictory requirements, that is, lightening and effective prevention of buckling.

Although each of the annular plates (24, 34, 44, 54, 64, 74) of the embodiments are made of a metal material, the other material having a properly tuned axial flexibility and rigidity for rotational directions may be used as a shaft-coupling annular plate. In the shown embodiments, the number of coupling mounting holes formed in the annular plate is set to "6", depending on the number of branched arms of the input-shaft-side yoke 22 and branched arms of the output-shaft-side yoke 23, circumferentially alternating with each other. As a matter of course, the number of coupling mounting holes formed in the annular plate is set to be identical to the total number of branched arms of the input-shaft-side yoke 22 and branched arms of the output-shaft-side yoke 23. The total number of branched arms of the input-shaft-side yoke 22 and branched arms of the output-shaft-side yoke 23 is not limited to "6". For example, when the total number of branched arms of the input-shaft-side yoke 22 and branched arms of the output-shaft-side yoke 23 is "4", the number of coupling mounting holes formed in the annular plate is set to "4".

The entire contents of Japanese Patent Application Nos. P2000-167297 (filed Jun. 5, 2000) and P2000-171047 (filed Jun. 7, 2000) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An axially flexible shaft coupling for a vehicle, comprising:
   a substantially annular plate having a plurality of mounting holes formed therein and having a relatively higher stiffness for rotational directions than a stiffness for axial directions;
   a first group of coupled portions fixedly connected to a first shaft and circumferentially spaced with respect to each other;
   a second group of coupled portions fixedly connected to a second shaft and circumferentially spaced with respect to each other;
   the first and second groups of coupled portions being coupled with each other through the substantially annular plate placed therebetween, so that the first group of coupled portions circumferentially alternate with the second group of coupled portions;
   the substantially annular plate having coupling arm portions each extending between two adjacent mounting holes of the mounting holes to absorb vibrations for the axial directions by elastic deformation of each of the coupling arm portions; and
   a radial width of each of the coupling arm portions being dimensioned to be narrower than a radial width of a peripheral region of each of the mounting holes.

2. A flexible shaft coupling for a vehicle, comprising:
   a substantially annular plate having a plurality of mounting holes formed therein;
   a first group of coupled portions fixedly connected to a first shaft and circumferentially spaced with respect to each other;
   a second group of coupled portions fixedly connected to a second shaft and circumferentially spaced with respect to each other;
   the first and second groups of coupled portions being coupled with each other through the substantially annular plate placed therebetween, so that the first group of coupled portions circumferentially alternate with the second group of coupled portions;
   the substantially annular plate having coupling arm portions each extending between two adjacent mounting holes of the mounting holes to absorb vibrations for the axial directions by elastic deformation of each of the coupling arm portions; and
   a radial width of each of the coupling arm portions being dimensioned to be narrower than a radial width of a peripheral region of each of the mounting holes,
   wherein each of the coupling arm portions has a lightening hole formed therein, and each of the coupling arm portions is divided by the lightening hole into a first radial-outward arm portion placed outside of a hypothetical line segment between and including centers of the two adjacent mounting holes and a second radial-inward arm portion placed inside of the hypothetical line segment.

3. The flexible shaft coupling as claimed in claim 2, wherein the lightening holes are formed as circular-arc shaped holes arranged concentrically with respect to a pitch circle passing through the centers of the mounting holes formed in the substantially annular plate, and an inner peripheral wall portion of the substantially annular plate is shaped to be concentric to the pitch circle.

4. The flexible shaft coupling as claimed in claim 2, wherein a length of the first radial-outward arm portion is dimensioned to be substantially identical to a length of the second radial-inward arm portion.

5. The flexible shaft coupling as claimed in claim 4, wherein the first radial-outward arm portion and the second radial-inward arm portion are formed to be substantially parallel to the hypothetical line segment.

6. The flexible shaft coupling as claimed in claim 2, wherein the coupling arm portion being in tension by a tensile force acting between the two adjacent mounting holes during power transmission in a normal rotational direction comprises the first radial-outward arm portion and the second radial-inward arm portion, and the coupling arm portion being in compression by a compressive force acting between the two adjacent mounting holes during the power transmission in the normal rotational direction comprises only the first radial-outward arm portion.

7. The flexible shaft coupling as claimed in claim 1, wherein the substantially annular plate has the coupling arm portions formed therein by pressing.

8. The flexible shaft coupling as claimed in claim 1, wherein the coupling arm portion extending between the two adjacent mounting holes is placed outside of a hypothetical line segment between and including centers of the two adjacent mounting holes in a radial direction.

9. The flexible shaft coupling as claimed in claim 1, wherein the coupling arm portion extending between the two adjacent mounting holes is placed inside of a hypothetical line segment between and including centers of the two adjacent mounting holes in a radial direction.

10. An axially flexible shaft coupling for a vehicle, comprising:
    a substantially annular plate serving as a torque-transmission member for rotational directions and having a plurality of mounting holes formed therein and having a relatively higher stiffness for the rotational directions than a stiffness for axial directions;

a first group of coupled portions fixedly connected to a first shaft and circumferentially spaced with respect to each other;

a second group of coupled portions fixedly connected to a second shaft and circumferentially spaced with respect to each other;

the first and second groups of coupled portions being coupled with each other through the substantially annular plate placed therebetween, so that the first group of coupled portions circumferentially alternate with the second group of coupled portions;

the substantially annular plate having coupling arm portions each extending between two adjacent mounting holes of the mounting holes to absorb vibrations for the axial directions by elastic deformation of each of the coupling arm portions; and a thickness of each of the coupling arm portions being dimensioned to be thinner than a thickness of a peripheral region of each of the mounting holes.

11. A flexible shaft coupling for a vehicle, comprising:

a substantially annular plate serving as a torque-transmission member for rotational directions and having a plurality of mounting holes formed therein;

a first group of coupled portions fixedly connected to an output shaft and circumferentially spaced with respect to each other;

a second group of coupled portions fixedly connected to an input shaft and circumferentially spaced with respect to each other;

the first and second groups of coupled portions being coupled with each other through the substantially annular plate placed therebetween by way of fastening means, so that the first group of coupled portions circumferentially alternate with the second group of coupled portions;

the substantially annular plate having coupling arm portions each extending between two adjacent mounting holes of the mounting holes for the fastening means to absorb vibrations for axial directions by elastic deformation of each of the coupling arm portions;

each of the coupling arm portions has a lightening hole formed therein, and each of the coupling arm portions is divided by the lightening hole into a first radial-outward arm portion placed outside of a hypothetical line segment between and including centers of the two adjacent mounting holes and a second radial-inward arm portion placed inside of the hypothetical line segment; and a sum of a radial width of the first radial-outward arm portion and a radial width of the second radial-inward arm portion being dimensioned to be narrower than a radial width of a peripheral region of each of the mounting holes.

12. The flexible shaft coupling as claimed in claim 11, wherein the lightening holes are formed as circular-arc shaped holes arranged concentrically with respect to a pitch circle passing through the centers of the mounting holes formed in the substantially annular plate, and an inner peripheral wall portion of the substantially annular plate is shaped to be concentric to the pitch circle.

13. The flexible shaft coupling as claimed in claim 11, wherein a length of the first radial-outward arm portion is dimensioned to be substantially identical to a length of the second radial-inward arm portion.

14. The flexible shaft coupling as claimed in claim 13, wherein the first radial-outward arm portion and the second radial-inward arm portion are formed to be substantially parallel to the hypothetical line segment.

15. The flexible shaft coupling as claimed in claim 13, wherein the coupling arm portion being in tension by a tensile force acting between the two adjacent mounting holes during power transmission in a normal rotational direction comprises the first radial-outward arm portion and the second radial-inward arm portion, and the coupling arm portion being in compression by a compressive force acting between the two adjacent mounting holes during the power transmission in the normal rotational direction comprises only the first radial-outward arm portion.

16. The flexible shaft coupling as claimed in claim 2, wherein the substantially annular plate has a relatively higher stiffness for rotational directions than a stiffness for axial directions.

* * * * *